United States Patent
Massara

[19]
[11] Patent Number: 5,884,968
[45] Date of Patent: *Mar. 23, 1999

[54] SEAT ASSEMBLY WITH PNEUMATICALLY ADJUSTABLE CONTOUR AND ENERGY ABSORPTION

[75] Inventor: Andrew J. Massara, Vargön, Sweden

[73] Assignee: Lear Corporation, Southfield, Mich.

[ * ] Notice: The term of this patent shall not extend beyond the expiration date of Pat. No. 5,772,281.

[21] Appl. No.: 920,218

[22] Filed: Aug. 25, 1997

Related U.S. Application Data

[63] Continuation-in-part of Ser. No. 787,677, Jan. 23, 1997, abandoned.

[51] Int. Cl.⁶ .............................. B60N 2/42; A47C 3/025
[52] U.S. Cl. .................................. 297/216.12; 297/284.6
[58] Field of Search ..................................... 297/391, 404, 297/408, DIG. 3, 284.1, 284.4, 284.6, 216.1, 216.12, 216.13, 216.14

[56] References Cited

U.S. PATENT DOCUMENTS

| | | |
|---|---|---|
| 2,973,029 | 2/1961 | Schlosstein . |
| 3,259,435 | 7/1966 | Jordan, Jr. . |
| 4,350,388 | 9/1982 | Weiner . |
| 4,720,146 | 1/1988 | Mawbey et al. . |
| 4,865,388 | 9/1989 | Nemoto . |
| 4,966,413 | 10/1990 | Palarski . |
| 5,076,643 | 12/1991 | Colasanti et al. . |
| 5,082,326 | 1/1992 | Sekido et al. . |
| 5,135,282 | 8/1992 | Pappers . |
| 5,137,329 | 8/1992 | Neale . |
| 5,437,498 | 8/1995 | Waelde . |
| 5,558,398 | 9/1996 | Santos . |
| 5,567,017 | 10/1996 | Bourgeois et al. . |
| 5,772,281 | 6/1998 | Massara . |

FOREIGN PATENT DOCUMENTS

| | | |
|---|---|---|
| 2232726 | 1/1974 | Germany . |
| 2152202 | 11/1980 | Germany . |

*Primary Examiner*—Milton Nelson, Jr.
*Attorney, Agent, or Firm*—Brooks & Kushman P.C.

[57] ABSTRACT

A vehicle seat assembly includes a seat back shell having upper and lower ends, and a bracket mounted to the seat back shell having a slot formed therethrough. A flexible plate is positioned adjacent the seat back shell and slidable within the slot. A cushion is positioned adjacent the S-shaped flexible plate. At least one inflatable lumbar bladder is positioned between the shell and the flexible plate between the bracket and the lower end. At least one inflatable thoracic adjustment bladder is positioned between the shell and the flexible plate between the bracket and the upper end. The contour of the seat assembly is adjustable by inflating and deflating the lumbar and thoracic bladders. A head restraint system includes a damper mechanism positioned between the upper end of the shell and the head restraint for energy management in a high energy impact.

18 Claims, 3 Drawing Sheets

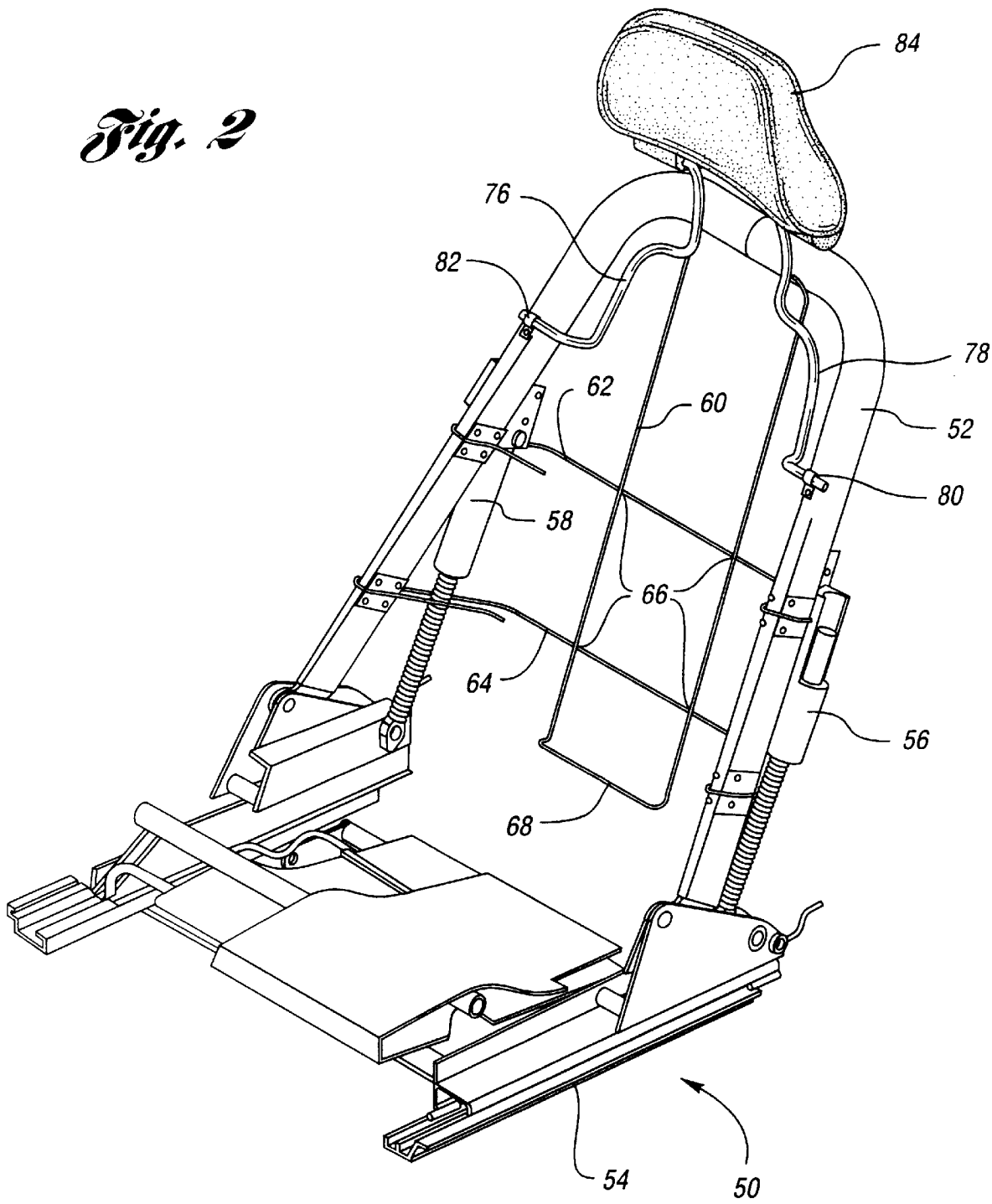

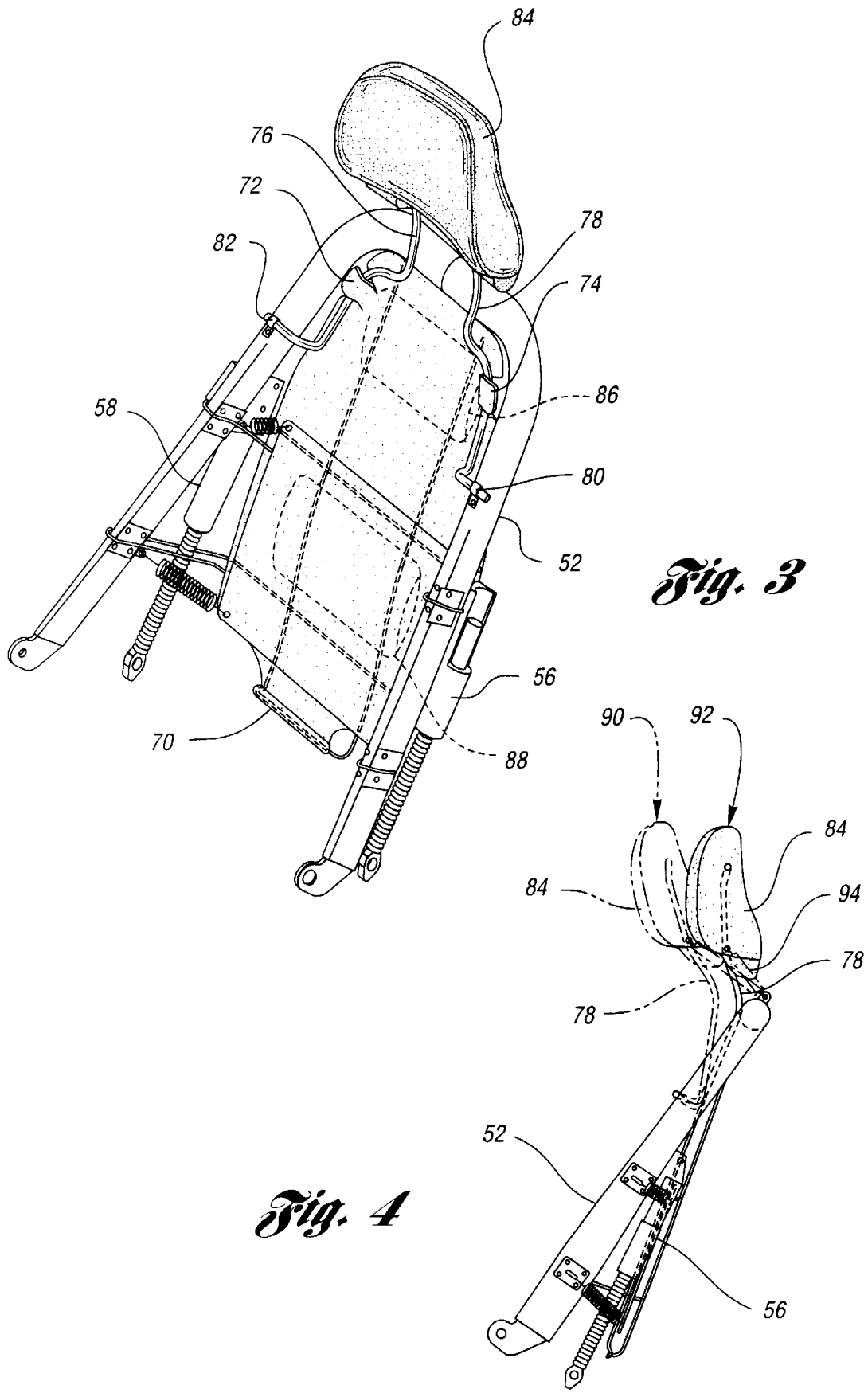

5,884,968

SEAT ASSEMBLY WITH PNEUMATICALLY ADJUSTABLE CONTOUR AND ENERGY ABSORPTION

CROSS-REFERENCE TO RELATED APPLICATION

This patent application is a continuation-in-part of Ser. No. 08/787,677, filed Jan. 23, 1997, attorney docket No. LEAR 0136 PUS, which is hereby incorporated by reference in its entirety.

TECHNICAL FIELD

The present invention relates to a seat assembly with a pneumatically adjustable contour and energy absorption capability.

BACKGROUND OF THE INVENTION

In a high energy impact, large impact forces may be delivered to the occupant by the seat in a rearward impact. As the occupant is forced against the seat, a large energy pulse may be experienced.

A particular safety problem may arise if the occupant has not properly adjusted the head restraint system or if the seat back does not closely, evenly and firmly support the entire spine during the impact. Undesirable spacing between the occupant and the seat back and head restraint may allow the occupant to be propelled against the seat.

No known seat assembly exists which provides close and firm support of the entire spine for the occupant, provides an adjustable seat back contour, and also manages energy in the head restraint in a high energy impact. Accordingly, it is desirable to provide such a vehicle seat assembly with an adjustable contour to closely fit against the spine of the occupant while including an adjustable head restraint system with energy management capability.

DISCLOSURE OF THE INVENTION

As a result of Lear Corporation's continuing efforts to improve vehicle safety, the present invention overcomes the above-referenced shortcomings of prior art seat assemblies by providing a pneumatic seat assembly in which the seat back and head restraint are pneumatically adjustable to closely fit the contour of the occupant's spine, and the head restraint is provided with a damper mechanism(s) for managing energy in a high energy impact.

More specifically, the present invention provides a vehicle seat assembly comprising a seat back having upper and lower ends, and a flexible plate positioned adjacent the seat back. The plate includes front and rear surfaces. A cushion is positioned against the front surface. At least one inflatable lumbar bladder is positioned against the rear surface of the flexible plate adjacent the lower end. At least one inflatable thoracic adjustment bladder is positioned against the rear surface adjacent the upper end. In this configuration, the contour of the seat assembly is adjustable by inflating and deflating the lumbar and thoracic bladders.

In the preferred embodiment, a head restraint member is secured to the second end of the flexible plate, whereby the head restraint member is adjustable forward and rearward in vehicle by inflating and deflating the thoracic adjustment bladder. Additionally, a damper mechanism(s) is positioned between the head restraint member and the upper end of the seat back for damping movement of the head restraint member in a high energy impact.

Accordingly, an object of the present invention is to provide a seat back assembly with an adjustable contour for providing close and firm support of the entire spine in a high energy impact.

A further object of the present invention is to provide a vehicle seat assembly including a head restraint mechanism incorporating a damper for managing energy in a high energy impact.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 shows a perspective view of a seat assembly in accordance with an alternative embodiment of the invention;

FIG. 3 shows a partial perspective view of a seat assembly in accordance with the embodiment of FIG. 2; and FIG. 4 shows a side view of the assembly of FIG. 3, illustrating two positions of the headrest.

DETAILED DESCRIPTION OF THE PREFERRED EMBODIMENTS

Figure 1:
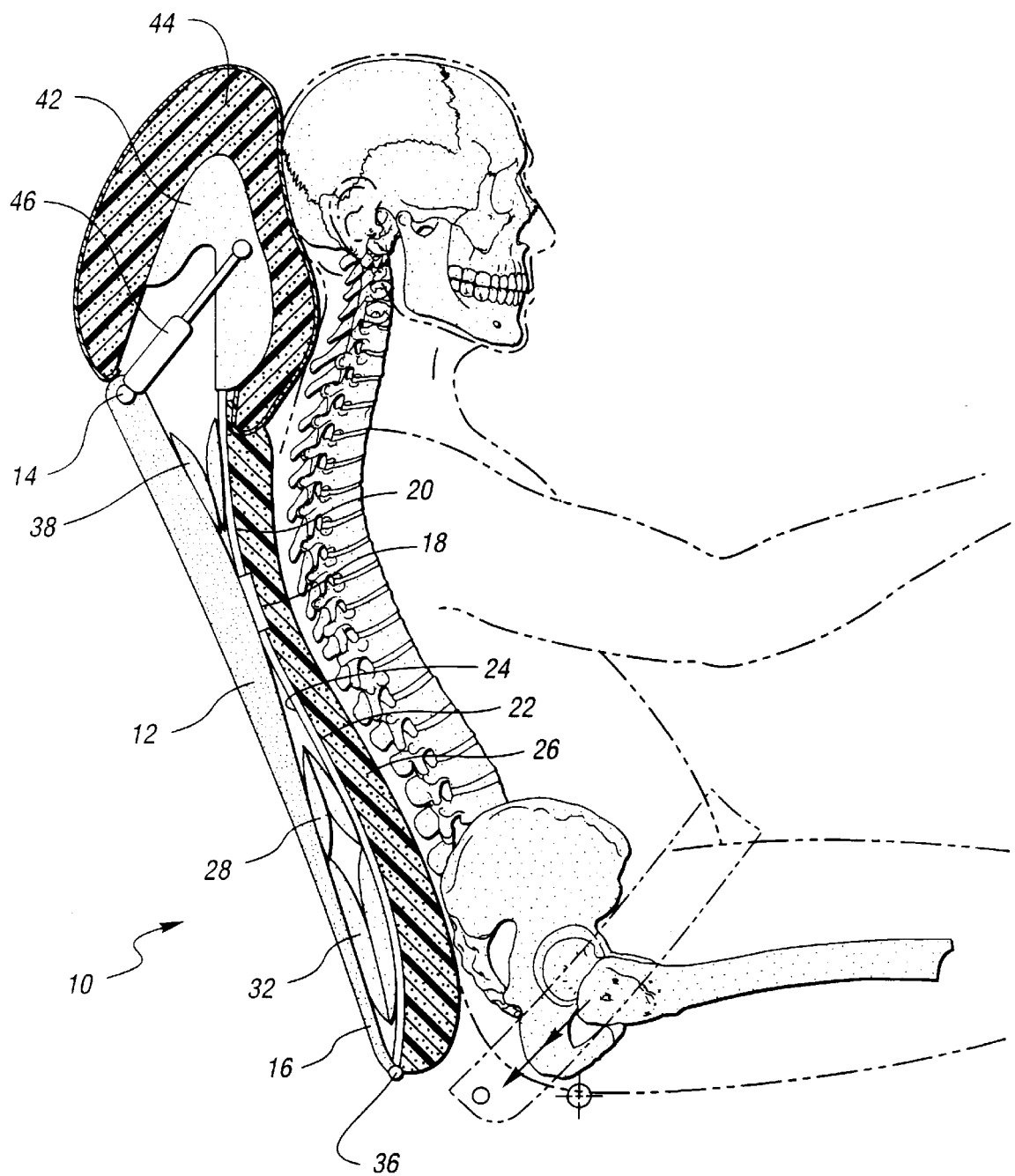
FIG. 1 shows a schematically arranged vertical cross-section of a vehicle seat assembly in accordance with the present invention.

FIG. 1 shows a schematically arranged vertical cross-sectional view of a vehicle seat assembly 10 in accordance with the present invention. The vehicle seat assembly 10 includes a seat back shell 12 having upper and lower ends 14,16, respectively. A bracket 18 is mounted to the seat back shell 12 and includes a slot formed therethrough. The bracket 18 is preferably a plastic member.

A flexible plate 20 is positioned adjacent the seat back shell 12 and is slidable within the slot formed in the bracket 18. The plate 20 includes first and second surfaces 22,24, respectively. A cushion 26 is positioned against the first surface 22 of the plate 20.

A plurality of inflatable lumbar bladders 28, 32 are positioned between the shell 12 and the flexible plate 20, between the bracket 18 and the lower end 16 of the shell 12.

The flexible plate 20 is hinged to the lower end 16 of the shell 12 by the hinge 36. Accordingly, when the inflatable lumbar bladders 28, 32, are inflated or deflated, the flexible plate 20 is flexed and pivots at the hinge 36, and the plate 20 slides within the bracket 18 such that the contour of the plate 20 is adjusted.

Similarly, an inflatable thoracic adjustment bladder 38 is positioned between the shell 12 and the flexible plate 20 between the bracket 18 and the upper end 14 of the shell 12. A head restraint member 42 is secured to the upper end of the flexible plate 20, whereby the head restraint member 42 is adjustable forward and rearward in vehicle by inflating and deflating the thoracic adjustment bladder 38. The head restraint member 42 is preferably a blow-molded hollow plastic material. An energy absorbing foam 44 is secured to the head restraint member 42.

A damper mechanism 46 is secured between the upper end 14 of the shell 12 and the head restraint member 42 for energy management in a high energy impact. The damper 46 will allow gradual movement of the head restraint member 42 with respect to the shell 12 as the thoracic adjustment bladder 38 is inflated or deflated for adjusting the forward/rearward position of the head restraint member 42 in the vehicle, and the damper 46 will be configured to dissipate head restraint energy in a rearward impact to cushion the load transfer between the occupant and the head restraint member 42.

Accordingly, in this configuration, the contour of the seat back may be adjusted by inflating or deflating the lumbar bladders 28, 32, and the thoracic bladder 38, to alter the curvature of the flexible plate 20 so that the seat back and head restraint fit closely adjacent the spine and neck of the vehicle occupant.

The various bladders 28, 32, 38, may be filled with any inert gas, or foam or liquid for additional energy management characteristics.

Additionally, the energy management aspects of the system may be tailored to the occupant weight. For example, using a pneumatic seat lift mechanism, the weight of the occupant may be sensed and this information may be used for adjusting the damper 46 and bladders 28, 32, 38.

The combination of the energy absorbing foam 44, the cushion 26, the damper 46, and bladders 28, 32, 38, will cooperate to manage energy of the occupant in a rearward impact and to prevent the occurrence of undesirable spinal compression or large energy pulses.

Referring to FIGS. 2–4, an alternative vehicle seat assembly is shown in accordance with the present invention. Referring to FIG. 2, the vehicle seat assembly 50 in accordance with the alternative embodiment includes a substantially U-shaped seat backframe 52 supported on a lower seat frame assembly 54, and including recliner mechanisms 56, 58 extending between the backframe 52 and the lower seat frame assembly 54. The seat backframe 52 is preferably a high strength steel tube, and the recliner mechanisms 56, 58 are preferably screw-and-nut recliners, such as those manufactured by P. L. Porter Corporation.

A seat back shell may be positioned behind the backframe 52 for attachment of trim components.

Wire rods 60, 62, 64 are supported by the backframe 52, and are welded together at the intersections 66 for providing forward support in the event of a sudden acceleration. The wire rod 60 includes an attachment portion 68 for snap-fit attachment of the bottom portion of a flexible plate 70, as shown in FIG. 3. The flexible plate 70 also includes tabs 72, 74 extending forwardly to form slots for receiving the guide tubes 76, 78, respectively. The guide tubes 76, 78 are preferably 10 mm diameter hollow steel tubes which are pivotally connected to the backframe 52 at the pivot joints 80, 82 and extend upwardly to support the head restraint 84. The heat restraint foam is preferably molded directly onto the guide tubes 76, 78.

As described with reference to the embodiment shown in FIG. 1, the flexible back plate 70 includes thoracic and lumbar support bladders 86, 88 for flexing the flexible plate for contour and headrest adjustment. The thoracic bladder 86 is supported against the wire rod 60 for facilitating adjustment of the head rest 84. When the thoracic bladder 86 is inflated or deflated, the guide tubes 76, 78 pivot about the pivot joints 80, 82, thus causing the head rest 84, which is supported on the guide tubes 76, 78, to pivot forward or rearward between positions 90 and 92, as illustrated in FIG. 4.

When the lumbar bladder 88 is inflated and deflated, the flexible plate 70 flexes accordingly, and the tabs 72, 74 will slide along the guide tubes 76, 78, thereby allowing flexing movement of the flexible plate 70 for adjusting the contour of the seat back.

As further illustrated in FIG. 4, and similarly described with reference to FIG. 1, a damper mechanism 94 may also be provided between the head restraint 84 and the seat back 52 for damping movement of the head restraint 84.

Alteratively, the thoracic bladder may be replaced with a ratcheting locking mechanism.

While the best modes for carrying out the invention have been described in detail, those familiar with the art to which this invention relates will recognize various alternative designs and embodiments for practicing the invention within the scope of the appended claims.

What is claimed is:

1. A vehicle seat assembly, comprising:
   a seat back shell having upper and lower ends;
   a bracket mounted to the seat back shell and having a slot formed therethrough;
   a flexible plate positioned adjacent the seat back shell and slidable within said slot, said plate having opposing first and second surfaces;
   a cushion positioned adjacent said first surface;
   at least one inflatable lumbar bladder positioned between said shell and said flexible plate between said bracket and said lower end; and
   a thoracic adjustment mechanism positioned between said shell and said flexible plate between said bracket and said upper end;
   whereby the contour of said seat assembly is adjustable by inflating and deflating said lumbar bladder and adjusting said thoracic adjustment mechanism.

2. The vehicle seat assembly of claim 1, wherein said flexible plate comprises first and second ends, said first end being hinged to said lower end of said seat back shell, and wherein said thoracic adjustment mechanism comprises at least one inflatable thoracic adjustment bladder.

3. The vehicle seat assembly of claim 2, further comprising a head restraint member secured to said second end of said flexible plate, whereby said head restraint member is adjustable forward and rearward in the vehicle by inflating and deflating said at least one thoracic adjustment bladder.

4. The vehicle seat assembly of claim 3, further comprising a damper mechanism connected to said head restraint member for damping movement of said head restraint member in a high energy impact.

5. The vehicle seat assembly of claim 4, further comprising an energy absorbing foam portion secured to said head restraint member.

6. The vehicle seat assembly of claim 2, wherein said lumbar and thoracic bladders are filled with foam for energy absorption in a high energy impact.

7. A vehicle seat assembly, comprising:
   a seat backframe having upper and lower ends;
   a damper mechanism secured to the upper end of said backframe;
   a head restraint member secured to said damper mechanism;
   at least one inflatable thoracic bladder positioned for adjusting said head restraint member with respect to said backframe; and
   wherein said damper mechanism is configured to dampen movement of said head restraint member in a high energy impact.

8. The vehicle seat assembly of claim 7, further comprising:
   a bracket mounted to the seat backframe and having a slot formed therethrough; and
   a flexible plate positioned adjacent said seat backframe and slidable within said slot, said plate having one end secured to the head restraint member.

9. The vehicle seat assembly of claim 8, further comprising:
   at least one lumbar bladder positioned between said flexible plate and said backframe between said bracket and said lower end of said backframe; and
   a hinge connecting said flexible plate to said lower end of said backframe;
   wherein the contour of said seat assembly is adjustable by inflating and deflating said thoracic and lumbar bladders to flex said flexible plate.

10. The vehicle seat assembly of claim 9, further comprising a cushion positioned adjacent said flexible plate.

11. The vehicle seat assembly of claim 7, further comprising an energy absorbing foam portion secured to said head restraint member.

12. The vehicle seat assembly of claim 7, wherein said lumbar and thoracic bladders are filled with foam for energy absorption in a high energy impact.

13. A vehicle seat assembly, comprising:
   a seat back having upper and lower ends;
   a flexible plate positioned adjacent the seat back, said plate having front and rear surfaces;
   a cushion positioned adjacent said front surface;
   at least one inflatable lumbar bladder positioned against the rear surface of the flexible plate adjacent said lower end;
   at least one inflatable thoracic adjustment bladder positioned against the rear surface of the flexible plate adjacent said upper end;
   whereby the contour of said seat assembly is adjustable by inflating and deflating said lumbar and thoracic bladders; and
   a guide member extending from the seat back for guiding sliding movement of the flexible plate as the bladders are inflated and deflated, wherein said guide member comprises a pair of guide tubes extending from the seat back for cooperation with a pair of tabs extending from the flexible plate.

14. The vehicle seat assembly of claim 13, wherein said seat back comprises a substantially U-shaped backframe.

15. The vehicle seat assembly of claim 14, further comprising a plurality of steel rods extending within the backframe for supporting at least one of the bladders.

16. The vehicle seat assembly of claim 13, wherein said seat back comprises a seat back shell.

17. The vehicle seat assembly of claim 13, wherein said guide member comprises a bracket mounted to the seat back and having a slot formed therein for slidably receiving the flexible plate.

18. The vehicle seat assembly of claim 13, further comprising a headrest attached to the pair of guide tubes.

* * * * *